US006457252B1

(12) United States Patent
Kershner

(10) Patent No.: US 6,457,252 B1
(45) Date of Patent: Oct. 1, 2002

(54) MEASURING TAPE WITH MAGNETIC FASTENER AND ASSOCIATED POUCH

(76) Inventor: Gary Patrick Kershner, 1768 E. Pleasant Valley Rd., Cleveland, OH (US) 44131

( * ) Notice: Subject to any disclaimer, the term of this patent is extended or adjusted under 35 U.S.C. 154(b) by 0 days.

(21) Appl. No.: 09/316,921

(22) Filed: May 21, 1999

Related U.S. Application Data
(60) Provisional application No. 60/086,687, filed on May 22, 1998.

(51) Int. Cl.[7] .................................................. G01B 3/10
(52) U.S. Cl. ............................. 33/760; 33/755; 33/768; 33/769
(58) Field of Search ........................ 33/760, 768, 769, 33/755, 759, 761; 224/904, 252, 183

(56) References Cited

U.S. PATENT DOCUMENTS

| | | | |
|---|---|---|---|
| 992,170 A | 5/1911 | Crane | 33/758 |
| 2,663,941 A | 12/1953 | Dart | 33/768 |
| D196,542 S | * 10/1963 | Zelnick | 224/904 |
| D271,253 S | * 11/1983 | Abatie | 224/904 |
| 4,580,347 A | 4/1986 | McKnight | 224/252 |
| 4,598,027 A | * 7/1986 | Johnson | 224/252 |
| 4,690,316 A | 9/1987 | Peterson | 224/253 |
| 4,827,622 A | 5/1989 | Makar | 33/770 |
| 4,924,597 A | 5/1990 | Tursi | 33/758 |
| 5,025,966 A | * 6/1991 | Potter | 224/252 |
| 5,100,037 A | * 3/1992 | Kopyta et al. | 224/904 |
| 5,213,240 A | * 5/1993 | Dietz et al. | 224/183 |
| 5,257,729 A | * 11/1993 | Silvernail | 33/760 |
| 5,388,741 A | * 2/1995 | Hillinger | 224/904 |
| 5,481,813 A | 1/1996 | Templeton | 33/758 |
| 5,544,420 A | 8/1996 | Choi | 33/760 |
| 5,915,610 A | * 6/1999 | Russell | 224/904 |
| 6,053,447 A | * 4/2000 | Omri | 33/769 |

FOREIGN PATENT DOCUMENTS

| | | |
|---|---|---|
| FR | 1545905 | 11/1967 |
| FR | 2706031 | 6/1994 |

\* cited by examiner

*Primary Examiner*—Diego Gutierrez
*Assistant Examiner*—Yaritza Guadalupe
(74) *Attorney, Agent, or Firm*—Fay, Sharpe, Fagan, Minnich & McKee, LLP

(57) ABSTRACT

A measuring apparatus is disclosed which is used for measuring distances in a convenient and efficient manner. The measuring apparatus includes a measuring tape having a front face and a rear face defining a housing. A magnet is connected to one of the faces of the measuring tape for releasably securing the measuring tape to a ferromagnetic material. The measuring tape also includes an elongated, spring-loaded measuring member selectively extensible from the housing. The measuring apparatus further includes a retaining pouch having a base member of generally flattened configuration and having opposed planar front and rear surfaces. The pouch also includes a pocket member to receive and retain the measuring tape. The pouch further includes a mechanism for magnetically co-acting the pouch with the magnet of the measuring tape. This mechanism has at least one ferromagnetic member that is generally flat and made of metal plate which is attached to the pouch. The mechanism may include a first and second ferromagnetic member wherein the first member is affixed to a lower region of the base member and the second member is affixed to an upper region of the base member. The first ferromagnetic member provides a secure temporary storage area for the measuring tape, and the second member provides a more permanent storage area for the measuring device. The pouch of the measuring apparatus further includes a first and second access notch. The first notch allows extension and retraction of the measuring member from the measuring tape while the tape is secured in the pocket of the pouch. The second notch facilitates removal of the measuring tape from its storage position in the pocket of the pouch.

11 Claims, 2 Drawing Sheets

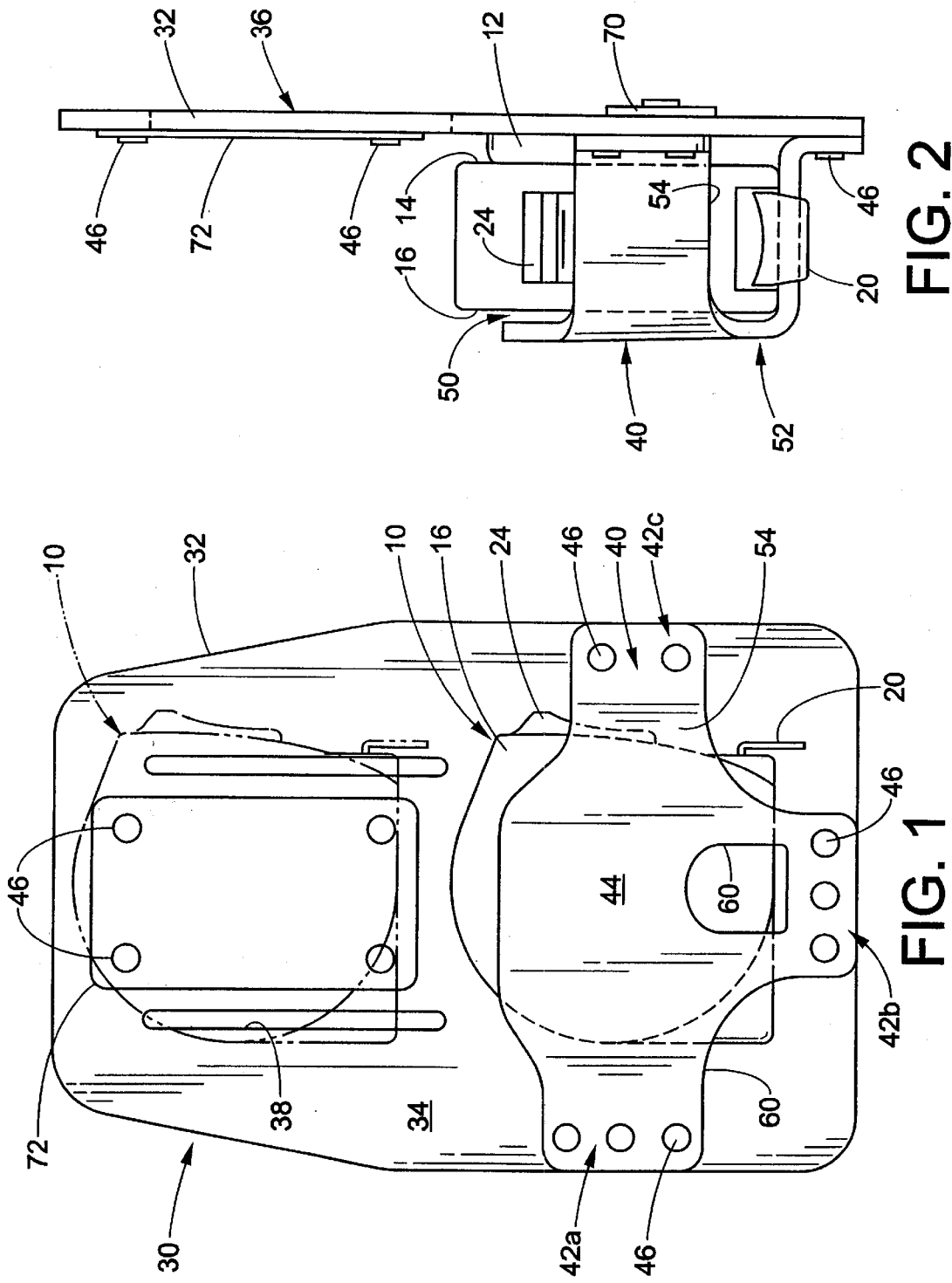

MEASURING TAPE WITH MAGNETIC FASTENER AND ASSOCIATED POUCH

CROSS-REFERENCE TO RELATED APPLICATION

This application claims priority from U.S. Provisional Application Ser. No. 60/086,687 filed May 22, 1998.

BACKGROUND OF THE INVENTION

The present invention relates generally to a measuring tape and associated pouch for retaining same, and more particularly to a measuring tape including a permanent magnet affixed thereto, and an associated pouch including at least one ferromagnetic member adapted for magnetic engagement by the permanent magnet of the measuring tape, whereby said measuring tape is firmly yet releasably secured to the pouch.

It is generally known to provide a measuring tape with an associated pouch for retaining the tape when it is not in use. Most commonly, the pouch is adapted for attachment to a belt of a user so that the measuring tape is obtained from and returned to the pouch as needed. These prior pouches have included mechanical means for securing the tape therein. More particularly, these prior pouches have relied on one or more straps, flaps, or other such inconvenient arrangements. When used, these straps and the like are generally effective in securing a measuring tape in an associated pouch. However, because a user must expend considerable time and effort to operate these prior straps and the like, they are often not used. This leads to an inconvenient and unsafe condition. A measuring tape that is not properly secured in its pouch is likely to become dislodged from the pouch. On a construction site, for example, a falling measuring tape can be a lethal projectile. Also, dropped tapes are frequently damaged and/or unrecoverable.

Prior pouches also do not provide any means for temporarily yet securely retaining an associated measuring tape without requiring the tape to be fully inserted into the pouch. That is to say, even if a user needs to secure the tape for only a brief amount of time, the user is forced to fully insert the tape into the pouch and fasten a strap or the like. Of course, this is inconvenient, and leads to a user not properly inserting his/her tape into the pouch when only temporary storage is desired. Instead, the tape is rested on a nearby surface or the like where it is susceptible to being lost or to falling.

Accordingly, it has been deemed desirable to develop a measuring tape and associated pouch for securely and conveniently retaining the measuring tape, both for long-term storage and for temporary storage.

SUMMARY OF THE INVENTION

The present invention relates generally to a measuring apparatus for measuring distances.

More specifically, the measuring apparatus is used for measuring distances in a manner that is convenient, efficient, and easy. Primarily through the use of magnets and ferromagnetic material, the present invention provides an effective measuring apparatus that allows the user to temporarily store the measuring device without requiring the tape to be fully inserted into a holder or pouch. In addition, a notch in the lower portion of the pouch of the measuring apparatus allows the user to measure distances without having to ever take the measuring tape out of the pouch.

The measuring apparatus is comprised of a measuring tape adapted for measuring distances. The measuring tape includes a front face and a rear face defining a housing, a magnet connected to one of the faces of the measuring tape, an elongated, spring loaded measuring member selectively extensible from the housing, and a brake mechanism for selectively inhibiting extension and or retraction of the measuring member. The measuring apparatus further comprises a retaining pouch. The retaining pouch includes a base member of generally flattened configuration having opposed planar front and rear surfaces, a pocket member extending outwardly from the front surface of the base member which forms a pocket to receive and retain the measuring tape, and a means for magnetically co-acting the pouch with the magnet of the measuring tape to releasably and securely connect the measuring tape in the pocket of the pouch.

According to another aspect of the invention, a retaining pouch is adapted for receiving an associated measuring tape. The retaining pouch comprises a base member of generally flattened configuration having opposed planar front and rear surfaces, a pocket member operatively associated with the base member extending outwardly from the front surface of the base member forming a pocket to receive an associated measuring tape between the base member and the pocket member, and a means for magnetically co-acting the pouch with an associated measuring tape.

According to another aspect of the invention, an apparatus comprises a measuring tape device for measuring distances. The measuring tape device includes a housing, defined by front and rear faces, having an indexed measuring member therein and selectively extensible therefrom. The apparatus further comprises a permanent magnet fixedly secured to one of the faces, and a pouch adapted for releasably retaining the measuring tape. The pouch includes a base member and a pocket member arranged to define an open pocket adapted to receive the measuring tape device. The pouch also includes a first ferromagnetic region located in the region of the open pocket and adapted to co-act with the permanent magnet of the measuring tape device when the device is inserted into the open pocket so as to releasably and magnetically retain the device in the open pocket.

One advantage of the present invention is the provision of a measuring apparatus having a secure and safe temporary storage area which provides the user with a convenient and easily accessible place to put an associated measuring tape without having to fully insert the tape into a pouch.

Another advantage of the present invention is the provision of a measuring apparatus having a retaining pouch which securely holds a measuring tape while at the same time provides a quick and convenient manner of disengaging the tape from the pocket without having to undue straps, flaps or the like.

Yet another advantage of the present invention is the provision of a measuring apparatus which securely and conveniently retains a measuring tape for both long-term and short-term storage.

Yet another advantage of the present invention is the provision of a measuring apparatus having a pouch with a notch on its lower portion which allows for extension or retraction of the measuring member without removal of the measuring tape body from the storage pocket of the pouch so that measurements can be made without having to move the measuring tape from its storage position.

Still another advantage of the present invention is the provision of a measuring apparatus having a measuring tape with a magnet attached thereto which allows the user to attach the measuring tape to any ferromagnetic material or safely retrieve nails and screws.

BRIEF DESCRIPTION OF THE DRAWINGS

The invention may take form in certain components and structures, preferred embodiments of which are illustrated in the accompanying drawings which form a part hereof and wherein:

FIG. 1 is a front elevational view of a measuring tape and associated pouch in accordance with the present invention (showing the measuring tape secured in a temporary storage position in phantom lines);

FIG. 2 is right side elevational view of the tape and associated pouch of FIG. 1;

DETAILED DESCRIPTION OF THE PREFERRED EMBODIMENTS

Figure 4:
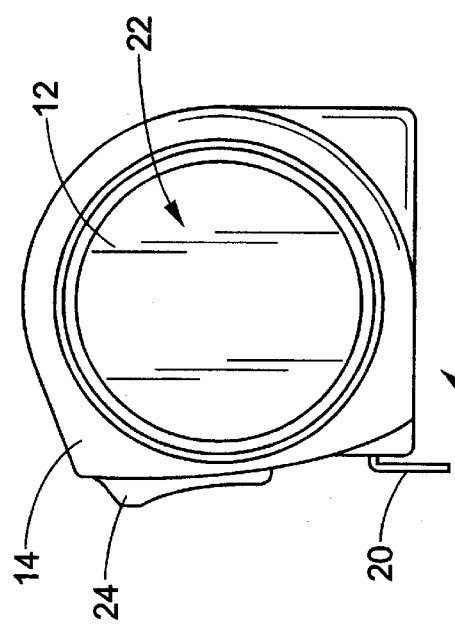
FIG. 4 is a rear elevational view of a measuring tape in accordance with the present invention.

Referring now to the drawings, a measuring tape 10 in accordance with the present invention includes a permanent magnet 12, preferably connected to either a rear face 14 or a front face 16 of a housing. A conventional belt clip (not shown) is optionally provided on the face 14,16 opposite the magnet 12 to provide means for securing the tape 10 to a user's belt or other clothing. The measuring tape 10 includes, in the housing defined by the front and rear faces, a selectively extensible, elongated, spring-loaded and indexed measuring tape or member 20 (only the tip shown) made from a suitable metal, plastic (e.g., polypropylene), or other suitable material, and is provided in any suitable size, e.g., 10–100 feet or more. The measuring tape 10 includes a brake mechanism 24 to selectively prevent extension and/or retraction of the tape 20 as is generally known in the art.

The permanent magnet 12 is preferably circular in configuration and includes a planar rear surface 22. Of course, the magnet 12 can be of any other suitable shape. Preferably, magnet 12 has a rating of at least approximately 65 pounds when the measuring member 20 is 50 feet in length, although magnets of other ratings (e.g., 25–65 pounds) may be used without departing from the scope and intent of the invention. Preferably, the magnet is fastened to a surface 14,16 of the tape body 10 using a screw and associated fastener not shown herein for clarity.

Figure 3:
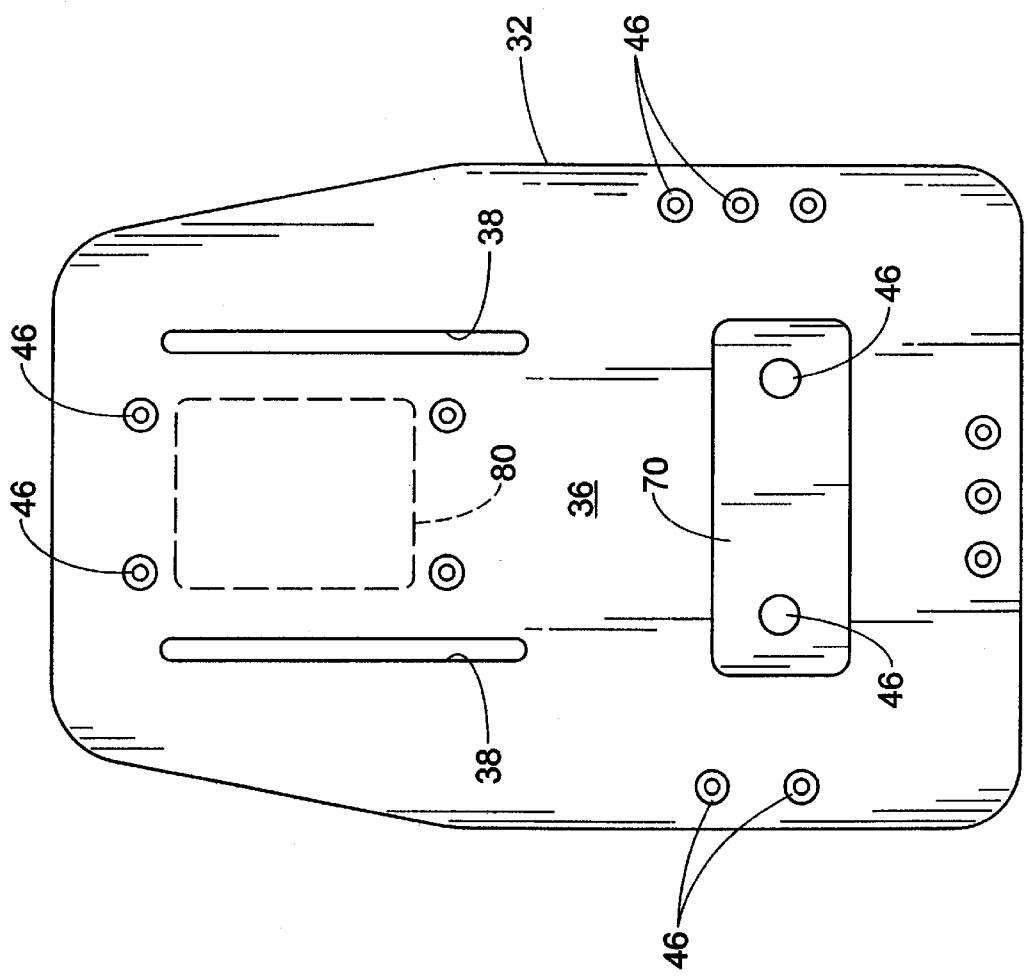
FIG. 3 is a rear elevational view of the measuring tape pouch of FIG. 1.

The associated measuring tape retaining pouch 30 is preferably fabricated from leather or the like, but any other suitable material may be used. Pouch 30 includes a base member 32 of a generally flattened configuration having opposed planar front and rear surfaces 34,36. The base member 32 also includes one or more belt slots 38 formed therethrough or other means adapted for receiving a user's belt therethrough to secure the pouch assembly 30 to the belt. For example, a conventional belt clip 80 (FIG. 3) is optionally provided in addition or as an alternative to the belt slots 38.

A pocket member 40 is affixed to or is a one-piece construction with the base member 32 via rivets 46 or fasteners, adhesive, or other means, and extends outwardly from the front surface 34 thereof. Pocket member 40 is secured to the base member 30 at three sides 42a,42b,42c. Accordingly, a measuring tape receiving pocket or slot 50 (FIG. 2) is formed between the pocket member 40 and the front surface 34 of the base member 32. The front face 44 of the pocket member provides a convenient surface into which letters may be engraved or onto which lettering may be affixed or otherwise provided to personalize the pouch 30 to a particular user.

The pocket member 40 is formed with a lower region 52 that includes a first tape access notch 54 that allows for extension and retraction of the measuring tape member 20 without removal of the measuring tape body 10 from the storage pocket 50 of the pouch. Accordingly, the measuring tape 10 is useful for quick and convenient measurements, even when in its storage position in the pocket 50. The lower region 52 of the pocket member 40 also includes at least one additional thumb/finger access notch 60 formed therein (two are shown in FIG. 1) to facilitate removal of the measuring tape body 10 from its storage position in the pocket 50.

The pouch 30 includes means for magnetically co-acting with the magnet 12 of the measuring tape 10 to releasably yet securely connect the measuring tape 10 to the pouch 30. As shown herein, the pouch 30 includes at least one ferromagnetic member, and preferably first and second ferromagnetic members 70,72 attached thereto or otherwise forming a part thereof. Alternatively, the pouch 30, itself, may be made from or comprise ferromagnetic material (e.g., plastic including iron particles dispersed therein, a layer of metallic foil within the pouch). In another preferred embodiment, the members 70,72 (or other means for magnetically co-acting with the magnet 12) are also permanently magnetic, and are arranged with a polarity opposite the polarity of the magnet 12, so that the magnet 12 is attracted thereto for an extra strong magnetic connection therebetween.

As shown herein, the ferromagnetic members 70,72 are flat metal plates 70,72 affixed to the pouch base 32 via rivets 46, although adhesive, stitching, or other suitable attachment means may be used. The plate members 70,72 are located at select locations to define a measuring tape storage position and a measuring tape temporary attachment or temporary storage position, respectively. More particularly, the member 70 is affixed to the rear surface 36 (although it may alternatively be affixed to the front surface 34) of the pouch 30 at a location where it is generally vertically aligned with the measuring tape magnet 12 when the measuring tape body 10 is positioned in the pocket 50. Accordingly, the magnet 12 and plate 70 co-act to magnetically secure the measuring tape 10 in its storage position within the pocket 50.

The member 72 is affixed to an upper region of the pouch base 32 above the pocket 50. Preferably, the member 72 is affixed to the front face 34, although it may alternatively be affixed to the rear face 36, of the pouch base 32. With particular reference to FIG. 1, the member 72 defines a temporary storage position for the measuring tape 10 (where the measuring tape is shown in phantom) in that it allows a user of the measuring tape 10 to magnetically affix the measuring tape via its magnet 12 to the plate 72 in a secure, convenient, and releasable manner, without requiring the user to insert the measuring tape 10 into the pocket 50.

Those skilled in the art will recognize that magnet 12 may alternatively form a part of the pouch 30 in the appropriate locations for magnetically co-acting with a ferromagnetic portion of the measuring tape 10 to secure the tape 10 in either the storage and/or temporary storage positions. Furthermore, it should be recognized that the ferromagnetic members 70,72 may be replaced by a single ferromagnetic member having portions that are located to define the storage and temporary tape storage positions.

It should also be recognized that the magnet 12 has many other uses. For example, it allows the measuring tape body 10 to be securely and releasably affixed to a steel beam, a door, a work bench or tool box, a machine, a round pipe, or other ferromagnetic support member to facilitate the taking of measurements or for temporary storage. The magnet 12 is also useful for testing metal for ferrous content, e.g., to detect stainless as opposed to conventional steel. The magnet 12 may also be used to retrieve drywall screws, nails, or other fasteners from a storage container or other location as an alternative to the manual retrieval of these items which can cause cuts to one's hands. When the tape 10 includes a belt clip affixed to one of the faces 14,16, the tape 10 may be secured to a user's belt using the clip, and the magnet 12 is then available for use as a temporary storage means for retaining screws, nails, and like items in a convenient and easily accessed location and manner. of course, the magnet 12 can alternatively or additionally be attached to the opposite side 16 of the measuring tape 10 as desired. In such case, the position of the tape access notch 54 in the pocket member 40 is relocated to the opposite lateral side of the pocket member so that the subject measuring tape is useful for both right-handed and left-handed users.

The invention has been described with reference to preferred embodiments. Obviously, modifications and alterations will occur to others upon reading and understanding the preceding specification. It is intended that the invention be construed as including all such modifications and alterations.

What is claimed is:

1. A measuring apparatus comprising:
   a measuring tape adapted for measuring distances, said measuring tape comprising:
      a front face and a rear face defining a housing;
      a magnet connected to one of the front and rear faces of the measuring tape for releasably securing the measuring tape to a ferromagnetic matieral;
      an elongated, spring-loaded measuring member selectively extensible from the housing; and
      a brake mechanism for selectively inhibiting extension and or retraction of the measuring member;
   said measuring apparatus further comprising a retaining pouch including:
      a base member of generally flattened configuration having opposed planar front and rear surfaces;
      a pocket member extending outwardly from the base member and forming a pocket between itself and said base member front surface, said measuring tape housing received and retained in the pocket between said pocket member and said base member;
      a first ferromagnetic member connected to the base member adjacent said pocket for magnetically co-acting the pouch with the magnet of the measuring tape to releasably and securely connect the measuring tape housing in the pocket of the pouch; and
      a second ferromagnetic member affixed to the base member of the pouch outside of said pocket and adapted for selective magnetic connection with the measuring tape magnet so as to provide a temporary storage position for the measuring tape outside of the pocket.

2. The measuring apparatus of claim 1, wherein the magnet is a circular configuration having a planar outwardly facing surface.

3. The measuring apparatus of claim 1, wherein the pouch is fabricated from leather.

4. The measuring apparatus of claim 1, wherein the pouch includes at least one belt slot for receiving a user's belt and securing the pouch to the belt.

5. The measuring apparatus of claim 1, wherein the pocket member of the pouch is attached to the base member at three sides.

6. The measuring apparatus of claim 1, wherein the pocket member of the pouch includes a lower region having a first tape access notch to said pocket that allows extension and retraction of the measuring member from the measuring tape secured in the pocket.

7. The measuring apparatus of claim 6, wherein a lower region of the pocket member includes at least one second access notch to said pocket to facilitate removal of the measuring tape from its storage position in the pocket and further to facilitate said measuring member being extensible and retractable by both a right-handed user or a left-handed user.

8. The measuring apparatus of claim 1, wherein the ferromagnetic member has a generally flat metal plate configuration operatively associated with the pouch adjacent the pocket.

9. The measuring apparatus of claim 1, wherein:
   the first ferromagnetic member is affixed to the base member of the pouch at a location generally aligned with the magnet of the measuring tape when the measuring tape is placed in the pocket for securing the measuring tape within its storage position within the pocket.

10. An apparatus comprising:
    a measuring tape device for measuring distances, said measuring tape device including a housing defined by front and rear faces, said housing including a measuring member therein and selectively extensible therefrom;
    a permanent magnet fixedly secured to one of said front and rear faces; and
    a pouch adapted for releasably retaining said measuring tape, said pouch including a base member and a pocket member arranged to define an open pocket between itself and the base member, said pocket adapted to receive said housing of said measuring tape device between said pocket member and said base member, said pouch further comprising a first ferromagnetic region aligned with said open pocket and adapted to co-act with said permanent magnet of said measuring tape device when said device is inserted into said open pocket so as to releasably and magnetically retain said housing of said measuring tape device in said open pocket; and
    a second ferromagnetic region located outside of said open pocket and adapted to co-act with said permanent magnet of said measuring tape device and releasably secure said device to said pouch outside of said open pocket when said magnet of said device is placed adjacent said second ferromagnetic region.

11. The apparatus as set forth in claim 10, further comprising a lower region of the pouch having at least one access notch to the pocket to facilitate extension and retraction of the measuring tape from its storage position in the pocket.

* * * * *